US008608096B2

(12) United States Patent
Funk et al.

(10) Patent No.: US 8,608,096 B2
(45) Date of Patent: Dec. 17, 2013

(54) METHOD FOR THE PRODUCTION OF WATER-ABSORBING POLYMER PARTICLES

(75) Inventors: Rüdiger Funk, Niedernhausen (DE);
Jürgen Schröder, Ludwigshafen (DE);
Emil Bitzer, Roedersheim-Gronau (DE)

(73) Assignee: BASF SE, Ludwigshafen (DE)

( * ) Notice: Subject to any disclaimer, the term of this patent is extended or adjusted under 35 U.S.C. 154(b) by 278 days.

(21) Appl. No.: 13/148,854

(22) PCT Filed: Feb. 15, 2010

(86) PCT No.: PCT/EP2010/051830
§ 371 (c)(1),
(2), (4) Date: Aug. 10, 2011

(87) PCT Pub. No.: WO2010/094639
PCT Pub. Date: Aug. 26, 2010

(65) Prior Publication Data
US 2012/0001000 A1     Jan. 5, 2012

(30) Foreign Application Priority Data
Feb. 18, 2009    (EP) .................................... 09153126

(51) Int. Cl.
*B02C 19/00*   (2006.01)
(52) U.S. Cl.
USPC ......................................................... 241/21
(58) Field of Classification Search
USPC .......................... 241/16, 21, 22; 209/381, 382
See application file for complete search history.

(56) References Cited

U.S. PATENT DOCUMENTS

| 5,203,965 A | * | 4/1993 | McCowan ....................... 162/55 |
| 5,915,567 A | * | 6/1999 | Zimmermann ................ 209/389 |
| 7,967,148 B2 | | 6/2011 | Stueven et al. |
| 2008/0202987 A1 | | 8/2008 | Weismantel et al. |
| 2009/0261023 A1 | | 10/2009 | Stueven et al. |
| 2009/0266747 A1 | | 10/2009 | Stueven et al. |

FOREIGN PATENT DOCUMENTS

| DE | 10 2005 001 789 A1 | 7/2006 |
| EP | 855 232 A2 | 7/1998 |
| WO | WO-2008/037673 A1 | 4/2008 |
| WO | WO-2008037672 A1 | 4/2008 |
| WO | WO-2008037675 A1 | 4/2008 |

OTHER PUBLICATIONS

Buccholz, F., et al. Modern Superabsorbent Polymer Technology, "Commercial Processes for the Manufacture of Superabsorbent Polymers." New York: John Wiley & Sons, Inc., 1998, pp. 71-103.

* cited by examiner

*Primary Examiner* — Mark Rosenbaum
(74) *Attorney, Agent, or Firm* — Marshall, Gerstein & Borun LLP

(57) ABSTRACT

A process for producing water-absorbing polymer particles, comprising classification by means of a tumbler screening machine, wherein the tumbler screening machine used for classification is equipped with at least one ball knock cleaning system and entrained balls are removed outside the tumbler screening machine by means of a capture device.

12 Claims, 2 Drawing Sheets

METHOD FOR THE PRODUCTION OF WATER-ABSORBING POLYMER PARTICLES

CROSS-REFERENCE TO RELATED APPLICATIONS

Figure 1:
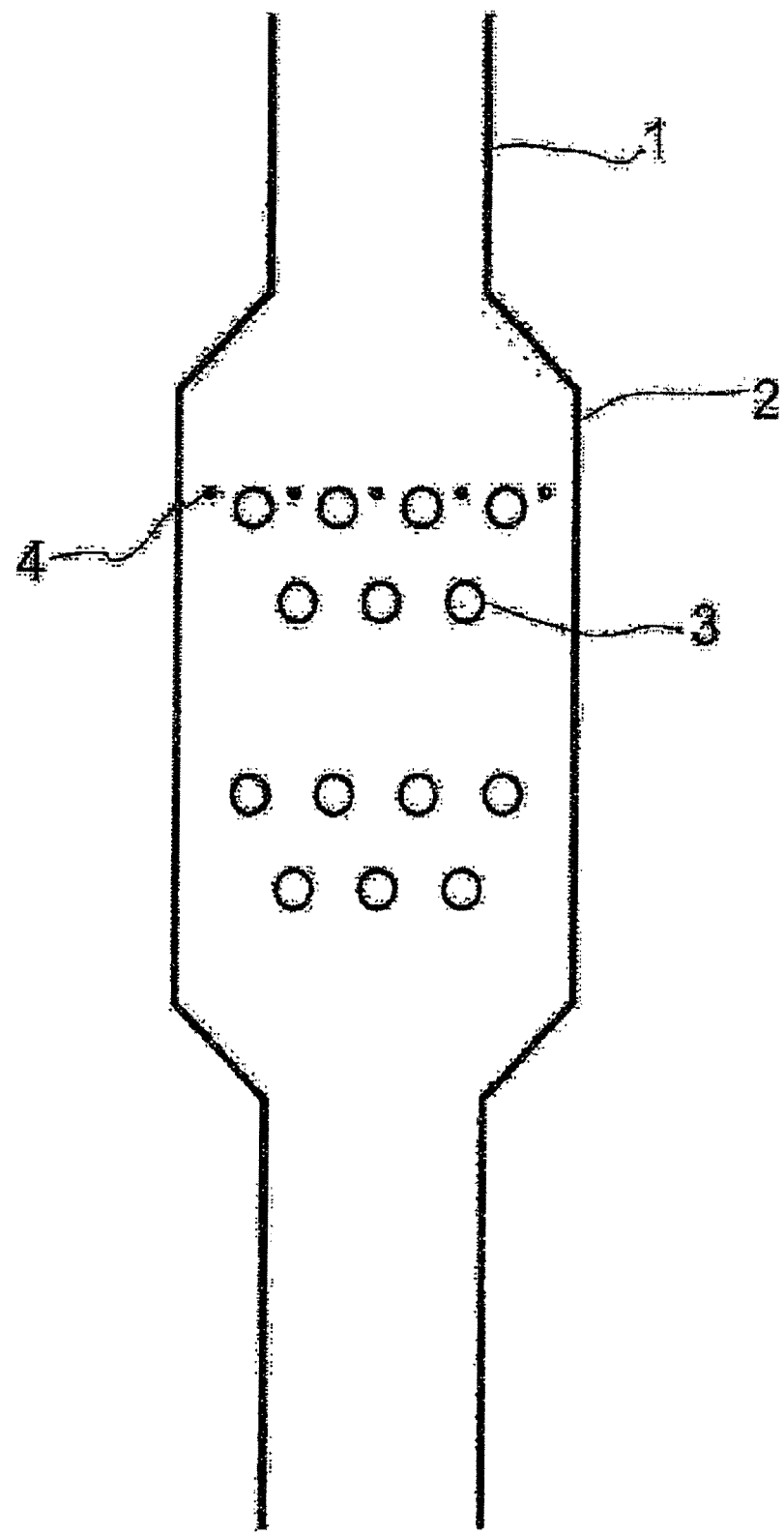

This is the U.S. national phase of International Application No. PCT/EP2010/051830, filed Feb. 15, 2010, which claims the benefit of European Patent Application No. 09153126.9, filed Feb. 18, 2009.

The present invention relates to a process for producing water-absorbing polymer particles, comprising a classification by means of a tumbler screening machine, wherein the tumbler screening machine used for classification is equipped with at least one ball knock cleaning system and entrained balls are removed outside the tumbler screening machine by means of a capture device.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

Typically, water-absorbing polymer particles are produced by solution polymerization. The polymer gels obtained by solution polymerization are dried, ground and classified. Frequently, the water-absorbing polymer particles are additionally surface postcrosslinked and classified once again.

The classification of water-absorbing polymer particles is described, for example, in EP 0 855 232 A2, DE 10 2005 001 789 A1, WO 2008/037672 A1, WO 2008/037673 A1 and WO 2008/037675 A1.

During the classification, polymer particles can become wedged in the screening meshes, which reduces the free screen area and hence the screening performance.

It was an object of the present invention to provide an improved process for producing water-absorbing polymer particles, especially a high screening performance and easy removal of foreign bodies.

The object is achieved by a process for producing water-absorbing polymer particles by polymerizing a monomer solution or suspension comprising a) at least one ethylenically unsaturated monomer which bears acid groups and may be at least partially neutralized,
b) at least one crosslinker,
c) at least one initiator,
d) optionally one or more ethylenically unsaturated monomers copolymerizable with the monomers mentioned under a) and
e) optionally one or more water-soluble polymers, comprising drying, grinding and classifying by means of at least one tumbler screening machine, wherein the tumbler screening machine used for classification is equipped with at least one ball knock cleaning system consisting of a base tray with elastic balls below a screen, the balls have a starting diameter x and the base tray has passage orifices for particles with a maximum particle diameter y, where y is less than x, and entrained elastic balls are removed outside the tumbler screening machine by means of a capture device, said capture device having passage orifices for particles with a maximum particle diameter z, where z is less than y.

The tumbler screening machines suitable for the classifying process according to the invention are not subject to any restriction. Tumbler screening machines usable for the process according to the invention are obtainable, for example, from ALLGAIER Werke GmbH, Uhingen, Germany, and MINOX Siebtechnik GmbH, Offenbach/Queich, Germany.

In a tumbler screening machine, the water-absorbing polymer particles to be classified are moved over the screen in a spiral manner owing to a forced vibration. The relatively long screening distance coupled with a small screening area leads to a high sharpness of separation in the classification. The forced vibration typically has an amplitude of 0.7 to 40 mm, preferably of 1.5 to 25 mm, and a frequency of 1 to 100 Hz, preferably of 5 to 10 Hz.

The tumbler screening machines usable in the process according to the invention preferably have at least two, more preferably at least three and most preferably at least four screens. Advantageously, the water-absorbing polymer particles falling down from the upper screen are deflected by a preferably funnel-shaped apparatus in the direction of the middle of the lower screen.

The mesh size of the screens is preferably in the range from 100 to 1 000 µm, more preferably in the range from 125 to 900 µm, most preferably in the range from 150 to 850 µm.

The water-absorbing polymer particles preferably have a temperature during the classification of 40 to 120° C., more preferably of 45 to 100° C., most preferably of 50 to 80° C.

The classification is particularly advantageously performed continuously. The throughput of water-absorbing polymer particles is typically at least 100 kg/m$^2$·h, preferably at least 150 kg/m$^2$·h, preferentially at least 200 kg/m$^2$·h, more preferably at least 250 kg/m$^2$·h, most preferably at least 300 kg/m$^2$·h.

A gas stream, more preferably air, flows over the water-absorbing polymer particles during the classification. The gas rate is typically from 0.1 to 10 m$^3$/h per m$^2$ of screen area, preferably from 0.5 to 5 m$^3$/h per m$^2$ of screen area, more preferably from 1 to 3 m$^3$/h per m$^2$ of screen area, the gas volume being measured under standard conditions (25° C. and 1 bar). The gas stream is more preferably heated slightly before entry into the screening apparatus, typically to a temperature of 40 to 120° C., preferably to a temperature of 50 to 110° C., preferentially to a temperature of 60 to 100° C., more preferably to a temperature of 65 to 90° C., most preferably to a temperature of 70 to 80° C. The water content of the gas stream is typically less than 5 g/kg, preferably less than 4.5 g/kg, preferentially less than 4 g/kg, more preferably less than 3.5 g/kg, most preferably less than 3 g/kg. A gas stream with a low water content can be obtained, for example, by condensing an appropriate amount of water out of a gas stream with higher water content by cooling.

In a preferred embodiment of the present invention, a plurality of tumbler screening machines are operated in parallel.

The tumbler screening machines are typically electrically grounded.

The ball knock cleaning system consists of a base tray with elastic balls below a screen. Owing to the tumbling motion of the screening machine, the elastic balls jump against the screen from below and thus remove wedged water-absorbing polymer particles from the screening machines.

The elastic balls are preferably made of natural rubber, silicone-modified ethylene-propylene-diene rubber (EPDM silicone), nitrile-butadiene rubber (NBR), styrene-butadiene rubber (SBR) or polyurethane, and have a starting diameter x of preferably 15 to 40 mm, more preferably of 20 to 35 mm, most preferably of 25 to 30 mm.

The base tray has passage orifices for the water-absorbing polymer particles to be classified. The shape of the passage orifices is not subject to any restriction, and it is possible, for example, to use circular, elliptical, square, rectangular or trapezoidal passage orifices. It is important that the elastic balls with the starting diameter x used for the ball knock cleaning cannot pass through the passage orifices. The elastic balls are thus held in the area between the base tray and the screen above. The water-absorbing polymer particles to be classified, in contrast, can pass through the passage orifices and hence are not retained by the base tray.

The passage orifices of the base tray are therefore passable only to particles whose particle diameter y is less than the starting diameter x of the balls used in the ball knock device. The particle diameter y is preferably 1 to 20 mm, more preferably 2 to 15 mm, most preferably 5 to 10 mm, less than the starting diameter x.

For example, for the ball knock device, it would be possible to use elastic balls with a starting diameter x of 26 mm and a base tray with circular passage orifices. The diameter of the circular passage orifices could be 20 mm. This base tray effectively retains elastic balls with a diameter of greater than 20 mm, while particles with a particle diameter y of 20 mm or less can pass through the passage orifices.

The capture device has capture orifices for the water-absorbing polymer particles to be classified. The shape of the passage orifices is likewise not subject to any restriction, and it is possible to use, for example, circular, elliptical, square, rectangular or trapezoidal passage orifices. The water-absorbing polymer particles to be classified can pass through the passage orifices and are thus not retained by the capture device.

The present invention is based on the finding that the elastic balls used in the ball knock device become worn in the course of operation of the tumbler screening machine, and the diameter of the elastic balls decreases over time. After prolonged operation of the tumbler screening machine, worn elastic balls can therefore pass through the passage orifices of the base tray and leave the tumbler screening machine together with the appropriate screen fraction of water-absorbing polymer particles. Typically, the worn elastic balls would therefore be replaced completely by new elastic balls in a timely manner. By virtue of the capture device for use in accordance with the invention, entrained worn elastic balls, i.e. those which pass through a passage orifice of the base tray, are removed from the water-absorbing polymer particles. This allows the time intervals after which the elastic balls are exchanged to be prolonged significantly and the shutdown times of the tumbler screening machine to be shortened significantly.

The passage orifices of the capture device are therefore passable only to particles whose particle diameter z is less than the particle diameter y. The particle diameter z is preferably 0.1 to 10 mm, more preferably 0.2 to 5 mm, most preferably 0.5 to 2 mm, less than the particle diameter y.

The capture device used is advantageously a magnetic separator with tube magnets arranged in parallel, it being possible for at least one bar to be additionally inserted parallel to the tube magnets between two tube magnets in each case. FIG. 1 shows such a capture device, where the reference numerals are defined as follows:

1 Product flow line
2 Magnetic separator
3 Tube magnet
4 Bar

For example, for the ball knock device, it would be possible to use elastic balls with a starting diameter x of 26 mm, a base tray with circular passage orifices and a magnetic separator with tube magnets arranged in parallel as the capture device. The diameter of the circular passage orifices could be 20 mm and the distance between the tubular magnets could be 15 mm. Worn elastic balls with a diameter of 19 mm will pass through the passage orifices of the base tray, and pass together with the water-absorbing polymer particles into the magnetic separator and are retained there.

The tube magnets become laden during operation with metallic impurities and adhering water-absorbing polymer particles and therefore have to be cleaned regularly. To this end, the tube magnets are removed from the magnetic separator and the adhering metallic impurities and water-absorbing polymer particles are removed, for example, by means of a vacuum cleaner.

For easier cleaning, tube magnets can be used in additional, detachable sleeves of a nonmagnetizable material, for example stainless steel. Material deposited on the additional sleeves can be removed easily by pulling out the tube magnets. Such systems are available, for example, under the name EASY CLEAN cleanability system (S+S Separation and Sorting Technology GmbH, Schönberg, Germany). A disadvantage here is that the magnet field strength at the active surface and hence the separation rate falls as a result of the use of the additional sleeves.

The temperature of the water-absorbing polymer particles in the magnetic separator is preferably from 30 to 90° C., more preferably from 40 to 80° C., most preferably from 50 to 70° C.

The moisture content of the water-absorbing polymer particles in the magnetic separator is preferably from 1 to 20% by weight, more preferably from 2 to 10% by weight, most preferably from 2.5 to 5% by weight, and is determined by the EDANA recommended test method No. WSP 230.2-05 "Moisture Content".

The use of magnetic separators in the production of water-absorbing polymer particles leads to increased abrasion owing to the additional mechanical stress. The magnetic separation is frequently the last process step in the production of water-absorbing polymer particles. This abraded material is therefore not removed and hence worsens the product properties.

The mechanical stability of the water-absorbing polymer particles can be increased significantly by heat treatment and additionally by establishment of a minimum moisture content. Excessively high temperatures, in contrast, weaken the magnetic field.

Excessively high moisture contents in conjunction with excessively high temperatures should, in contrast, be avoided, since the tack of the water-absorbing polymer particles increases in this case.

When the water-absorbing polymer particles are thermally aftertreated at relatively high temperatures, for example greater than 160° C., for example for surface postcrosslinking, the water-absorbing polymer particles have a very low moisture content. It is therefore advantageous to increase the moisture content of the water-absorbing polymer particles upstream of the magnetic separator.

The moisture content is typically increased by adding water or aqueous solutions in suitable mixing devices. Advantageously, mixers with high-speed mixing tools are used, since they minimize the tendency of the water-absorbing polymer particles to form lumps. Further parameters influencing the tendency to form lumps are the temperature of the water-absorbing polymer particles and the ionic strength of the aqueous solution used for moistening. The tendency to form lumps decreases with rising temperature and rising ionic strength.

The tube magnets used typically have a magnetic flux density of at least 0.6 T, more preferably of at least 0.9 T, most preferably of at least 1.1 T.

The tube magnets of the magnetic separator are typically present directly in the product stream line. The product stream line is not subject to any restrictions. Suitable product stream lines are, for example, pipelines in which the water-absorbing polymer particles are conveyed pneumatically or gravimetrically. The diameter of the product stream line is preferably from 5 to 50 cm, more preferably from 15 to 40 cm, most preferably from 20 to 35 cm.

The flow through the magnetic separator is advantageously from the top downward. It is possible in this context that the water-absorbing polymer particles are conducted through the magnetic separator essentially owing to their own weight.

The distance between the tube magnets should be selected such that a sufficient gap is available for the product stream and, on the other hand, a sufficient magnetic field strength in the middle of the gap is ensured.

The diameter of the tube magnets is preferably from 5 to 30 mm, more preferably from 5 to 20 mm, most preferably from 5 to 10 mm. The gap width between the tube magnets is preferably from 5 to 30 mm, more preferably from 8 to 25 mm, most preferably from 10 to 20 mm.

Advantageously, a plurality of tube magnets are arranged alongside one another and offset, one on top of another. This increases the separation rate of the magnetic separator.

The areal loading of the magnetic separator is preferably from 2 to 15 $g/cm^2s$, more preferably from 4 to 12 $g/cm^2s$, most preferably from 6 to 8 $g/cm^2s$. The areal loading is the product mass in g which passes the cross-sectional area of 1 $cm^2$ at right angles to the product flow direction in 1 s.

In the case of too low an areal loading, metallic impurities can be conducted around the tube magnets in laminar flow. In the case of too high an areal loading, it is possible for already separated metallic impurities to be knocked off the tube magnets again.

A gas stream, for example air or technical grade nitrogen, may additionally flow through the magnetic separator. The gas stream has a water content of preferably less than 5 g/kg, more preferably of less than 4 g/kg, most preferably of less than 3 g/kg.

The present invention is based on the finding that the worn elastic balls can advantageously be collected in a magnetic separator. The tube magnets of the magnetic separator have to be cleaned frequently and are therefore typically arranged in removable cassettes. Suitable adjustment of the magnetic separator allows worn elastic balls to be captured and removed without additional complexity in the customary cleaning of the magnetic separator.

The entrained elastic balls can also advantageously be discharged continuously. For example, the capture device may be tilted relative to the horizontal, preferably by at least 10°, more preferably by at least 30°, very preferably by at least 50°. In this way, the entrained elastic balls can be removed continuously and laterally from the product stream.

Figure 2:
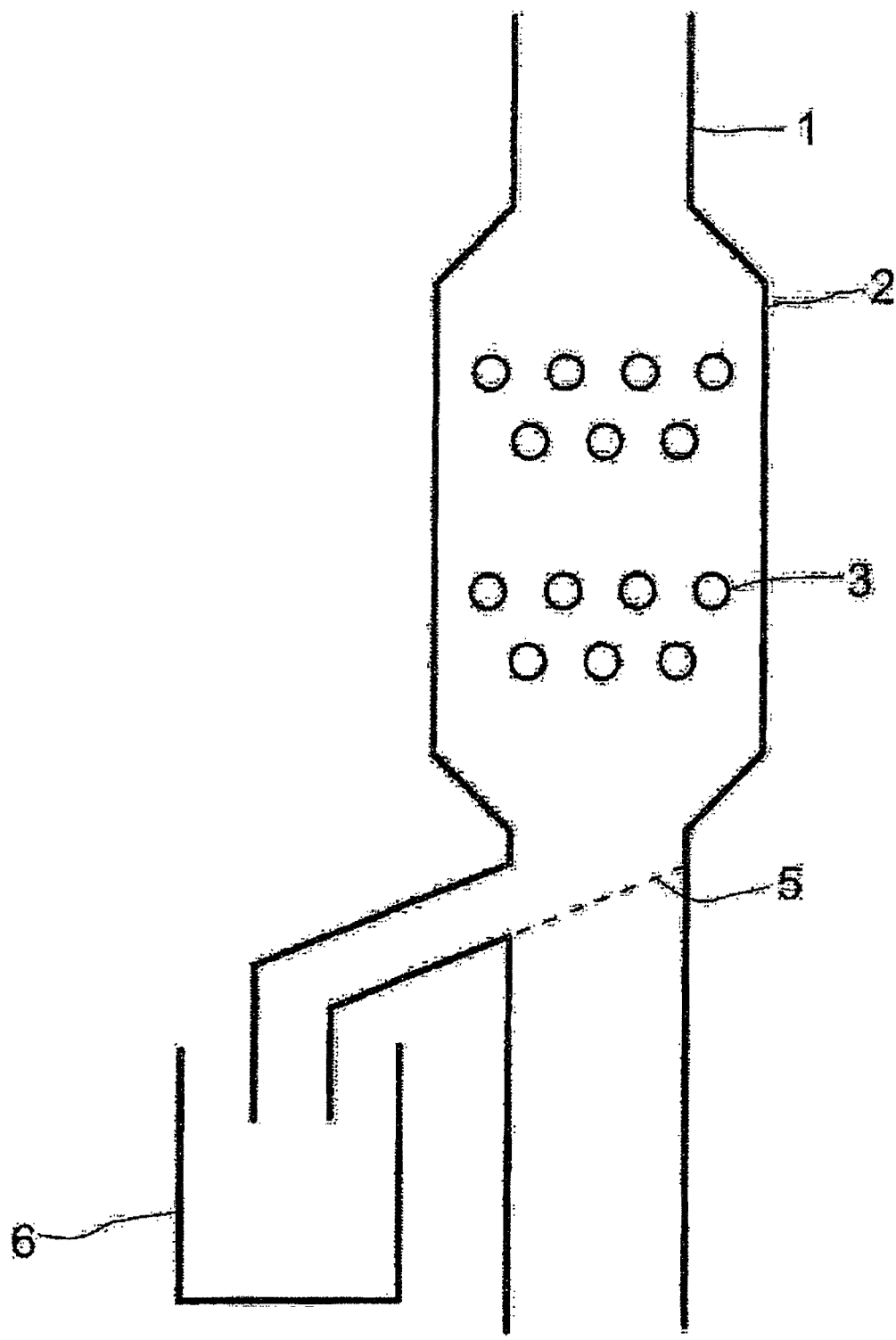

The continuous capture device may, for example, be installed below a magnetic separator. FIG. 2 shows such a continuous capture device, where the reference numerals are defined as follows:
1 Product stream line
2 Magnetic separator
3 Tube magnet
5 Capture device
6 Collecting vessel The water-absorbing polymer particles are prepared by polymerizing a monomer solution or suspension and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E). Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.05 to 1.5% by weight, more preferably from 0.1 to 1% by weight, most preferably from 0.3 to 0.6% by weight, based in each case on monomer a). With rising crosslinker content, the centrifuge retention capacity (CRC) falls and the absorption under a pressure of 21.0 g/cm² passes through a maximum.

The initiators c) may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen, and the polymerization inhibitor present in the monomer solution deactivated, before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel, which has to be comminuted in a further process step, for example in an extruder or kneader.

However, it is also possible to dropletize an aqueous monomer solution and to polymerize the droplets obtained in a heated carrier gas stream. This allows the process steps of polymerization and drying to be combined, as described in WO 2008/040715 A2 and WO 2008/052971 A1.

The acid groups of the resulting polymer gels have typically been partially neutralized. Neutralization is preferably carried out at the monomer stage. This is typically done by mixing in the neutralizing agent as an aqueous solution or preferably also as a solid. The degree of neutralization is preferably from 25 to 95 mol %, more preferably from 30 to 80 mol %, most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably from 0.5 to 15% by weight, more preferably from 1 to 10% by weight, most preferably from 2 to 8% by weight, the residual moisture content being determined by the EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained (fines). The solids content of the gel before the drying is preferably from 25 to 90% by weight, more preferably from 35 to 70% by weight, most preferably from 40 to 60% by weight. Optionally, it is, however, also possible to use a fluidized bed drier or a paddle drier for the drying operation.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the permeability (SFC). The proportion of excessively small polymer particles (fines) should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled have been surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until in an apparatus connected downstream of the polymerization reactor, for example in an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

Advantageously, the proportion of particles having a particle size of at most 600 µm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked.

Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or p-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidone and its derivatives, such as 2-hydroxyethyl-2-oxazolidone in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred surface postcrosslinkers are glycerol, ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinkers is preferably 0.001 to 2% by weight, more preferably 0.02 to 1% by weight, most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either before or during the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® horizontal paddle driers (Hosokawa Micron GmbH; Leingarten; Germany), Hosokawa Bepex® disk driers (Hosokawa Micron GmbH; Leingarten; Germany) and Nara paddle driers (NARA Machinery Europe; Frechen; Germany). Moreover, it is also possible to use fluidized bed driers.

The drying can be effected in the mixer itself, by heating the jacket or blowing in warm air. Equally suitable is a downstream drier, for example a shelf drier, a rotary tube oven or a heatable screw. It is particularly advantageous to mix and dry in a fluidized bed drier.

Preferred drying temperatures are in the range of 100 to 250° C., preferably 120 to 220° C., more preferably 130 to 210° C., most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably from 0 to 15% by weight, more preferably from 0.2 to 10% by weight, most preferably from 0.5 to 8% by weight, the water content being determined by the EDANA recommended test method No. WSP 230.2-05 "Moisture Content".

The water-absorbing polymer particles produced by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined by the EDANA recommended test method No. WSP 241.2-05 "Centrifuge Retention Capacity".

The water-absorbing polymer particles produced by the process according to the invention have an absorption under a pressure of 49.2 g/cm$^2$ of typically at least 15 g/g, preferably at least 20 g/g, preferentially at least 22 g/g, more preferably at least 24 g/g, most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to the EDANA recommended test method No. WSP 242.2-05 "Absorption under Pressure", except that a pressure of 49.2 g/cm$^2$ is established instead of a pressure of 21.0 g/cm$^2$.

The EDANA test methods are obtainable, for example, from EDANA, Avenue Eugene Plasky 157, B-1030 Brussels, Belgium.

The invention claimed is:

1. A process for producing water-absorbing polymer particles by polymerizing a monomer solution or suspension comprising
   at least one ethylenically unsaturated monomer which bears an acid group and may be at least partially neutralized,
   at least one crosslinker,
   at least one initiator,
   optionally one or more ethylenically unsaturated monomer copolymerizable with the monomers mentioned under a), and
   optionally one or more water-soluble polymer,
   comprising drying, grinding, and classifying using at least one tumbler screening machine, wherein the tumbler screening machine used for classification is equipped with at least one ball knock cleaning system consisting of a base tray with elastic balls below a screen, the balls have a starting diameter x and the base tray has passage orifices for particles with a maximum particle diameter y, where y is less than x, and entrained elastic balls are removed outside the tumbler screening machine by means of a capture device, said capture device having passage orifices for particles with a maximum particle diameter z, where z is less than y.

2. The process according to claim 1, wherein surface postcrosslinked water-absorbing polymer particles are classified in the tumbler screening machine.

3. The process according to claim 1, wherein the starting diameter of the elastic balls x is from 15 to 40 mm.

4. The process according to claim 1, wherein the elastic balls are made of natural rubber, silicone-modified ethylene-propylene-diene rubber, nitrile-butadiene rubber, styrene-butadiene rubber or polyurethane.

5. The process according to claim 1, wherein the base tray has passage orifices for particles with a particle diameter y, where y is from 1 to 20 mm smaller than x.

6. The process according to claim 1, wherein the passage orifices in the base tray are circular.

7. The process according to claim 1, wherein the capture device has passage orifices for particles with a particle diameter z, where z is from 0.1 to 10 mm less than y.

8. The process according to claim 1, wherein the capture device is a magnetic separator with tube magnets arranged in parallel.

9. The process according to claim 8, wherein at least one further bar, which is different from a tube magnet, is present between two tube magnets in each case.

10. The process according to claim 1, wherein the entrained elastic balls are discharged continuously by means of the capture device.

11. The process according to claim 10, wherein the capture device has an inclination of at least 30° to the horizontal.

12. The process according to claim 1, wherein the water-absorbing polymer particles have a centrifuge retention capacity of at least 15 g/g.

* * * * *